United States Patent [19]
Hasselmann

[11] Patent Number: 5,315,862
[45] Date of Patent: * May 31, 1994

[54] FLOW METER

[76] Inventor: Detlev E. M. Hasselmann, 519 S. Nardo, Solana Beach, Calif. 92075

[*] Notice: The portion of the term of this patent subsequent to Dec. 17, 2008 has been disclaimed.

[21] Appl. No.: 804,233

[22] Filed: Dec. 5, 1991

Related U.S. Application Data

[63] Continuation-in-part of Ser. No. 543,355, Jun. 25, 1990, Pat. No. 5,072,621.

[51] Int. Cl.⁵ .................... G01M 3/08; G01M 3/28
[52] U.S. Cl. ................................. 73/40.5 R; 73/49.1
[58] Field of Search ............... 73/40.5 R, 49.1, 49.2, 73/49.5

[56] References Cited

U.S. PATENT DOCUMENTS

| | | | |
|---|---|---|---|
| 3,039,295 | 6/1962 | LeMat et al. | 73/49.2 R |
| 3,304,546 | 2/1967 | Kern et al. | 73/40.5 R |
| 3,527,909 | 9/1970 | Torre | 73/49.2 R |
| 3,793,876 | 2/1974 | Oswald | 73/49.2 R |
| 3,939,383 | 2/1976 | Alm | 73/49.2 T |
| 3,940,020 | 2/1976 | McCrory et al. | 73/40.5 R |
| 3,978,709 | 9/1976 | Ando | 73/40.5 R |
| 4,811,252 | 3/1989 | Furuse | 73/49.2 R |
| 4,835,717 | 5/1989 | Michel et al. | 73/40.5 R |
| 5,046,519 | 9/1991 | Stenstrom et al. | 73/40.5 R |
| 5,072,621 | 12/1991 | Hasselmann | 73/40.5 R |

OTHER PUBLICATIONS

Kobold Instruments catalog on flow sensors and switches, comprising 12 pages and front and back covers.

Gems Express Service trade literature "Level and Flow Sensors" comprising 11 pages and front cover, 1990 Edition.

Primary Examiner—Hezron E. Williams
Assistant Examiner—George M. Dombroske
Attorney, Agent, or Firm—Baker, Maxham, Jester & Meador

[57] ABSTRACT

A flow meter for determining rates of fluid flow in a fluid conduit where the flow rates are low. The flow meter comprises a parallel combination of a controllable valve and a pressure differential sensing device coupled to the conduit. The flow meter operates by maintaining equal pressure on both sides thereof. When pressure unbalance occurs, the flow meter and associated control apparatus measures the amount of fluid necessary to equalize pressure. The frequency of fluid replenishment necessary to equalize the pressure determines flow rate.

14 Claims, 2 Drawing Sheets

FLOW METER

CROSS REFERENCE TO RELATED APPLICATION

This is a continuation-in-part of application Ser. No. 07/543,355, filed Jun. 25, 1990 now U.S. Pat. No. 5,072,621.

FIELD OF THE INVENTION

This invention relates generally to flow meters and more particularly to apparatus capable of detecting flow rates which are so low- as to be undetectable by a conventional flow meter.

BACKGROUND OF THE INVENTION

There are many reasons why one would want to be able to detect or measure, or both, fluids which are flowing at very low rates. Those rates may be as low as drops per minute or drops per hour. Examples of such low flow systems includes intravenous (IV) applications of nutrients or medicines to humans or animals. Another would be in a laboratory where drops of a liquid are added to another substance for a variety of purposes. Pesticides, insecticides or herbicides may be added to irrigation water at a very low rate.

As another example, increasing environmental awareness and respect for valuable natural resources has created an abiding concern in the area of underground leak detection. This is especially true with regard to fuel tank storage and dispensing systems. The industry has been continuously in search of new technologies and enhancements to existing technologies for underground leak detection, particularly pipeline leak detection.

Conventional leak detection methods for pipelines involve pressurizing the line and then observing a pressure decay when there is a leak. This method is subject to false readings due to temperature changes of the pressurized liquid caused by heating or cooling from the environment. A small temperature change, either a reduction or increase in temperature, can cause a large change in the pressure of liquid, which is, for the most purposes, incompressible. In pipelines, where a relatively few number of gallons of liquid may be involved, a very small amount of liquid volume, that is, flow, causes a large change in pressure. For example, a typical gasoline station may have 120 feet of pipe connected to one storage tank. There may be about 20 gallons of fuel in that length of pipe. A one-degree F change in liquid temperature at a typical temperature coefficient of expansion results in a detectable change in pressure. However, that one degree of temperature change results in a volume change of only 0.014 gallons of liquid.

Attempts to use currently available flow meters or flow sensors have been satisfactory for some purposes but they are insufficiently accurate to detect fluid flow at the minimum level required by the United States Environmental Protection Agency with respect to fuel storage and dispensing systems. This minimum level is currently 0.1 gallon per hour and any leak detection system for either fuel tanks or piping which does not achieve this minimum detection level will not be acceptable.

The currently available flow meters known to applicant all leak to some extent. Typically that leak rate may be in the range of at least one drop per second, which calculates to about 0.05 gallons per hour. That rate would be undetectable for those known flow meters. This is unacceptable for the very low flow applications mentioned above. Particularly with respect to the pipeline example, the apparent leak rate of 0.014 gallons per hour, if the one degree F change took place over the course of one hour, would be undetectable by a conventional flow meter. By way of further example, a leak rate of 0.1 gallon per hour amounts to only two drops per second. That is below the threshold leak rate detectable by currently available flow meters which themselves often leak at a rate of more than two drops per second.

A flow meter is a key element in a leak detector of the type mentioned above. If the flow meter can detect the extremely small flows which are mandated by current regulations for the fuel industry, it can enable a detection system to operate at the desired level of efficiency and sensitivity. Just as important are the uses for drip applications in the fields of medicine, science and agriculture, to name a few, where very low flow rates need to be detected and controlled.

Many flow meters currently available employ either small fixed calibrated orifices or have a sliding (piston) seal, or both. While these may sometimes detect the extremely low flow rates of interest, the small orifices or sliding surfaces are subject to being clogged by substances in the fluids passing through, such as varnishes in gasolines, or dirt particles in any fluids, thereby eventually making those flow meters inoperative.

SUMMARY OF THE INVENTION

Broadly speaking, this invention provides a flow meter which is sensitive to extremely low liquid flow rates. It provides significantly greater accuracy than has been previously available and can detect flow rates at any level, well below 0.1 gallons per hour.

The basic invention comprises a pressure sensitive device connected in parallel with a controllable flow valve. The valve is of the type which is either open or closed and has no partially open stable or intermediate position. The flow valve is normally closed and is opened under the influence of the pressure differential device when there is a differential pressure across the flow meter. This flow meter has no flow until there is a slight pressure differential across the flow valve. When the device detects a pressure difference, the controllable valve is opened to immediately equalize the pressure. By measuring the time the valve is open, or the number of times it is opened and closed, it is possible to calculate the volume of flow through the controllable valve and thereby determine the flow or leak rate in the pipeline to which the flow meter is connected.

In one application the flow meter of the invention is connected to a main pipeline in parallel with a shut-off valve. The shut-off valve may be positioned in the main pipeline between a dispenser valve and a pump, for example, in a fuel dispensing system. Testing of the system is accomplished by energizing the pump to create fluid pressure in the pipeline with the dispenser valve closed. As soon as delivery pressure is achieved in the pipeline, the shut-off valve is closed and the flow meter indicates whether or not there is in or out flow past the shut-off valve caused by liquid movement due to a pipeline leak. Of course, thermally caused volume changes must also be accounted for in a pipeline leak detection system.

Note that in this process, the main pump remains ON, supplying pressure to the shut-off valve and to the main pipeline, while flow rate determinations are made.

The flow meter of the invention is not limited to determining leak rate. It does depend on the existence of a pressure differential. Any flow of fluid involves pressure differentials. Because this flow meter is highly effective at extremely low flows it would most likely be utilized under low flow conditions. There are many circumstances under which flows measured in drops per minute or the like are desired and the flow rate is to be measured and maintained. The flow meter could be connected in series with a length of fluid conduit and operate effectively by detecting pressure differentials and responding thereto. Examples of such low flow applications include IV uses for applying nutrients or medicines to humans or animals, adding one substance to another, such as in laboratory situations, or adding pesticides and the like to irrigation water for crops.

The flow meter of the invention can sense and measure flows in either direction.

BRIEF DESCRIPTION OF THE DRAWING

The objects, advantages and features of the invention will be more readily perceived from the following detailed description, when read in conjunction with the accompanying drawing, in which.

FIG. 4 shows an automated embodiment of a leak detector system employing the flow meter of the invention;

DESCRIPTION OF THE PREFERRED EMBODIMENTS

Figure 1:
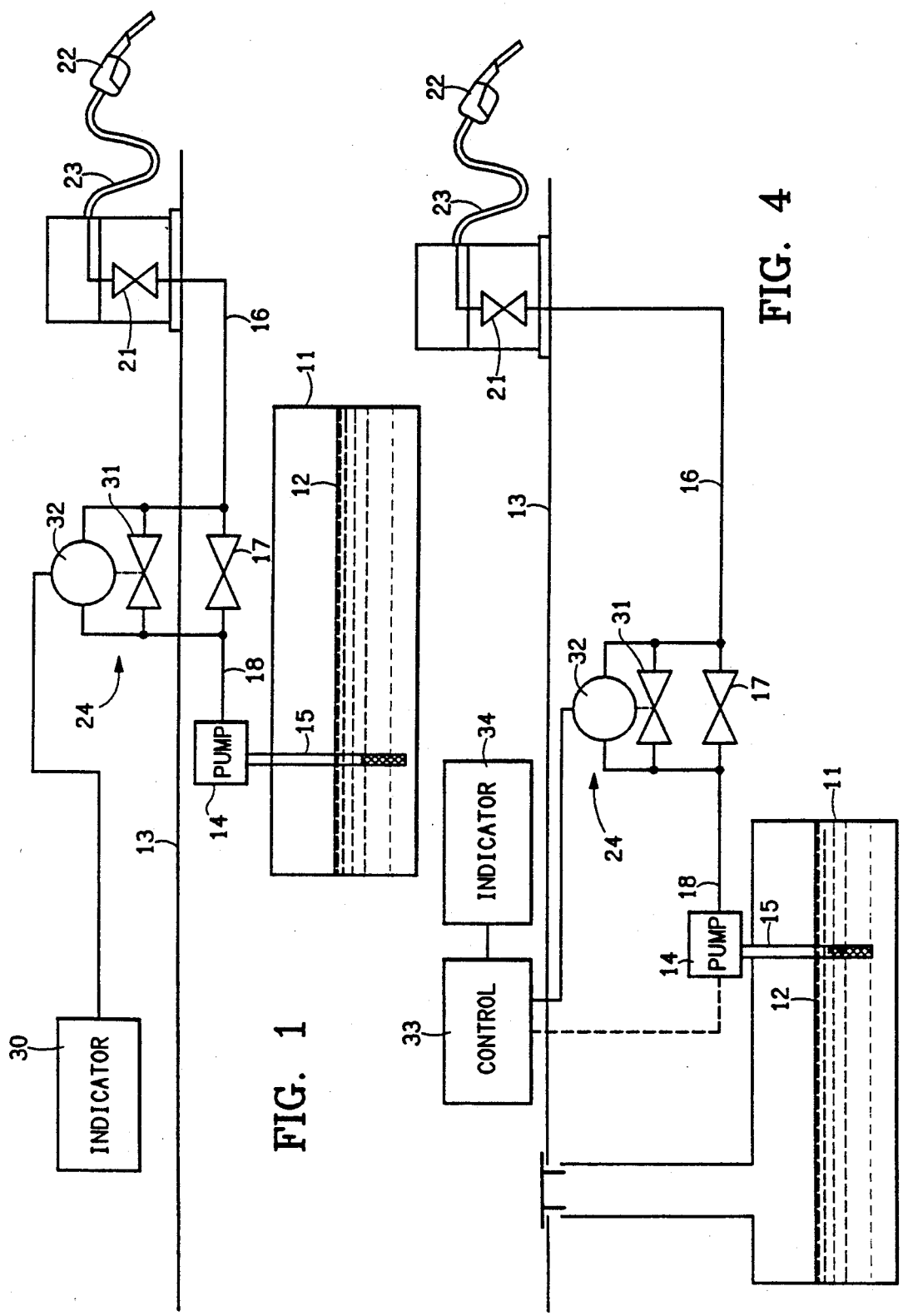
FIG. 1 depicts a basic pipeline leak detector apparatus employing the flow meter of the invention.

With reference now to the drawing, and more particularly to FIG. 1 thereof, there is shown tank 11 buried beneath ground grade level 13. The tank is filled to liquid level 12. Pump 14, which may be a submersible pump in tank 11, delivers liquid from the tank through lines 15 and 18 to main pipeline 16 in which is connected shut-off valve 17. At the end of pipeline 16 is dispenser valve 21 from which dispensing valve or nozzle 22 and hose 23 are connected. There may be several such dispensing valves and nozzles. Also connected in pipeline 16 across valve 17 is flow meter 24.

The process of determining pipeline leaks commences with closing dispenser valve 21 and energizing pump 14. In a very short time delivery pressure will have been achieved in pipeline 16, at which time shut-off valve 17 is closed. Pump 14 remains ON during the leak testing process. If flow meter 24 indicates no flow, it can be assumed that there is no product loss in pipeline 16 due to a leak. It may be necessary to wait several minutes in the event that there is heating or cooling of the liquid in the pipeline so that temperature caused pressure changes do not contaminate the readings. Such temperature changes in the liquid might occur due to a warm or cold ground environment and a cooler or warmer product. Cooling would cause the liquid to compress slightly thereby reducing the pressure in pipeline 16. On the other hand, warming causes the liquid to expand, thereby increasing the pipeline pressure. Because the flow meter responds to changes in pressure on either side of valve 17, a decrease in pressure in main pipeline 16 will cause fluid from charged pump 14 to flow through the flow meter and thereby stabilize the pressure. If there is an increase in pressure downstream, caused, for example, by an increase in temperature of the fluid in the main pipeline, the flow meter allows fluid to flow back toward the pump to equalize the pressure. The flow meter includes indicator 30 having a dial or a digital readout to calculate and show flow rate, typically in gallons per hour.

Figure 2:
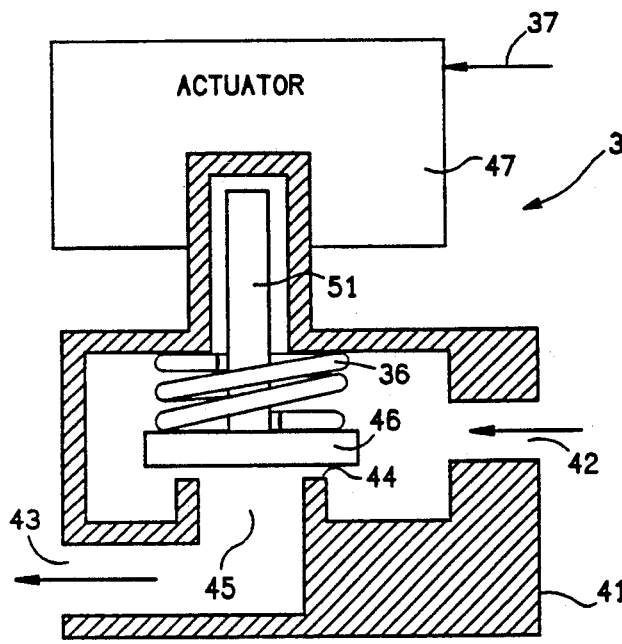
FIG. 2 is a schematic sectional view of the controllable flow meter valve of FIG. 1.
Figure 3:
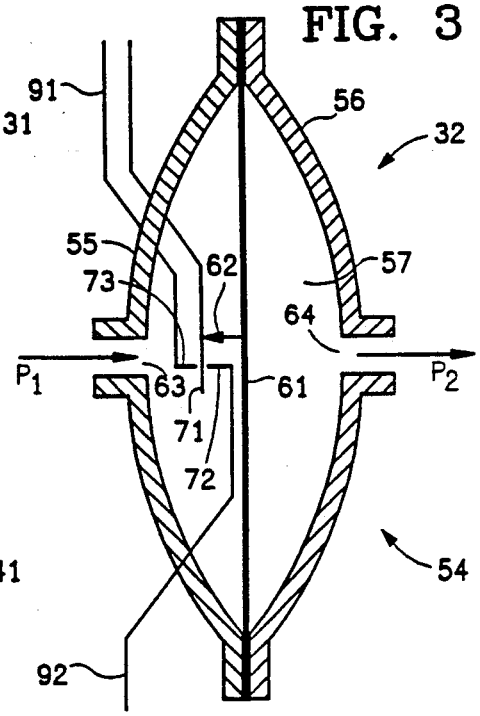
FIG. 3 is a schematic view of a differential pressure device suitable for use in the apparatus of FIG. 1.

The components of the flow meter of the invention are shown in FIGS. 2 and 3. In the FIG. 1 installation, the flow meter comprises controllable flow meter flow valve 31 connected in parallel with pressure differential device 32, both of which are shown connected in parallel with shut-off valve 17 in the main pipeline. Indicator 30 visually shows such parameters as the length of time valve 31 was open and the calculated amount of fluid that passed therethrough.

Valve 31 is shown in detail in FIG. 2. Valve body 41 has a passageway comprising inlet 42 and outlet 43, understanding, of course, that flow can be in either direction. Valve seat 44 is typically of an annular configuration defining passageway 45 which selectively interconnects inlet 42 and outlet 43. Valve disc 46 selectively opens and closes opening 45, depending on its vertical position with respect to valve seat 44. The disc normally rests on valve seat 44 under the influence of bias spring 36. The position of the valve disc is determined by actuator 47. The actuating element may be a coil, so valve 31 would be referred to as a solenoid valve. The valve may also be operated hydraulically or mechanically, as well as electrically. There may be other appropriate ways to move valve stem 51. The important thing is that the position of the valve stem is externally controllable pursuant to signals from device 32 on line 37. Further, actuator 47 has only two conditions; either ON or OFF, that is, either up (open) or down (closed). Stated another way, valve 31 is either open or closed and is normally closed.

Pressure differential device 32 is shown in detail in FIG. 3. In this case it is a pressure differential switch, but other pressure differential sensors would be suitable. Those may also include pressure switches and pressure transducers. Housing 54 is comprised of convex half sections 55 and 56 which, when sealed together, form cavity 57 therebetween. Secured between halves 55 and 56 is flexible diaphragm 61, shown schematically with attached plunger element 62. Opening 63 exposes one side of diaphragm 61 to pressure P1, for example, from line 18 (FIG. 1). Opening 64 exposes the other side of the diaphragm to pressure P2, such as in line 16. When pressures P1 and P2 are equal the switch is in the condition shown in FIG. 3 and valve 31 is closed. When P1 is larger than P2, contact 71, which moves with plunger 62, moves into engagement with contact 72, causing a signal to be generated to open valve 31 to equalize the pressures on opposite sides of the diaphragm. When P2 is larger than P1, contact 71 moves into engagement with contact 73, again causing a signal to open valve 31 to equalize the pressure.

Differential pressure device 32 is so constructed as to be extremely sensitive to minute pressure differentials. The actual distance diaphragm 61 and contact 71 must move to engage one of the other contacts is extremely small. Because liquid is for all practical purposes incompressible, a very few drops in a pressurized line containing a few gallons of the fluid will result in a detectable pressure change.

This structure can measure extremely small leak rates, effectively down to zero. As soon as there is a slight leak, a pressure differential exists between lines 16 and 18, effectively across the parallel combination of valve 31 and device 32. Until that time there is no flow around valve 17. The pressure differential device senses a small pressure change (either a drop or an increase), as low as two to five inches of water (0.072–0.181 psi), and opens valve 31. Since pump 14 continues to operate, the pressure is immediately equalized, no matter in which direction pressure equalizing flow occurs, and pressure device 32 again closes valve 31.

The automated version of the invention is shown in FIG. 4. Control system 33 is electrically connected to flow meter 24. It is also connected for control of pump 14. By measuring the time the flow meter, which comprises valve 31, remains open, it is possible to calculate the amount of flow through the flow meter. For example, if valve 31 remains ON for 10 seconds, it will represent 10 times as much flow as for a one second ON time. After two or three readings over a predetermined period of time, it is simple for control 33 to calculate the flow rate.

Alternatively, control 33 may open the flow meter valve for a fixed period of time, for example, one second or one-half second, the openings being spaced by fixed time intervals, for example, one second. The number of valve openings and closings necessary to equalize the pressure on either side of flow meter 24 can easily be converted to flow rate by the control and indicator apparatus. If the flow rate exceeds a predetermined minimum level, indicator 34 will show a leak or a "Fail" indication. Otherwise a "Pass" or no leak indication will appear on indicator 34. Control system 33 includes appropriate means for establishing a leak rate above which the pipeline system fails, that is, a flow rate set point. It also measures flow time, and integrates a series of calculations over a predetermined period of time to determine total flow and flow rate through the flow sensor.

It can be seen that the principle of operation of the leak detector of this invention is to maintain pressure on main line 16 and measure the volume of fluid necessary over a measured period of time to maintain that pressure. This requires that the main fuel delivery pump remain on during the leak test procedure. This apparatus is so sensitive that it can detect leak rates at least as low as 0.01 gallon per hour, which is equivalent to one drop in every five seconds.

The system of either FIG. 1 or FIG. 4 may be a permanent part of a dispensing installation. A leak test would be performed after each dispensing operation from nozzle 22. When the hook switch (not shown) at the dispensing station is opened, valves 17 and 21 are opened and pump 14 is actuated. Fluid is selectively dispensed through nozzle 22. When the dispensing procedure is completed, the hook switch is closed, thereby causing valves 17 and 21 to close. Pump 14 remains on and a reading is taken over the course of a few seconds or a few minutes to determine whether there is a leak in the line between pump 14 and valve 21. If not, pump 14 is turned off, ready for the next dispensing cycle.

Figure 5:
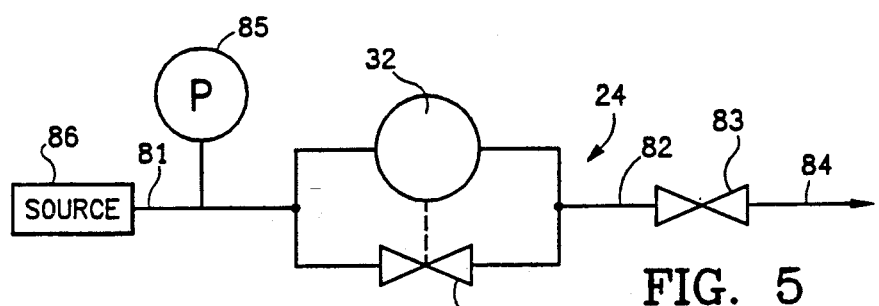
FIG. 5 shows the flow meter of the invention in series with a low flow line.

An alternative application for flow meter 24 is shown in FIG. 5. A source of fluid 86, such as a container of glucose solution for an IV, is connected to input line 81. Pressure sensor 85 is connected in input line 81 to enable the flow meter of the invention to be calibrated for various source pressures, for example, from source 86 or from pump 14 (FIGS. 1 and 4). The flow meter is connected in series between the source and output line 82, which leads to flow control valve 83. Valve 83 directly controls the flow in IV line 84 which is adapted to be coupled to a patient through the usual subcutaneous IV connection. Valve 83 can be set for the desired flow rate, such as one drop per second. However, there has been no previously available accurate indicator to measure the actual flow through lines 82 and 84 and valve 83. The flow rate is normally determined visually by the operator. The flow meter of this invention, when connected to the indicator of FIG. 1, or to the indicator and control of FIG. 4, is able to measure and indicate with extreme precision the actual flow through valve 83, no matter how low the flow rate. As valve 83 lets through a drop or two, device 32 indicates a pressure change and opens flow valve 31 to equalize the pressure, as previously described. Flow rate is easily calculated as discussed above.

Figure 6:
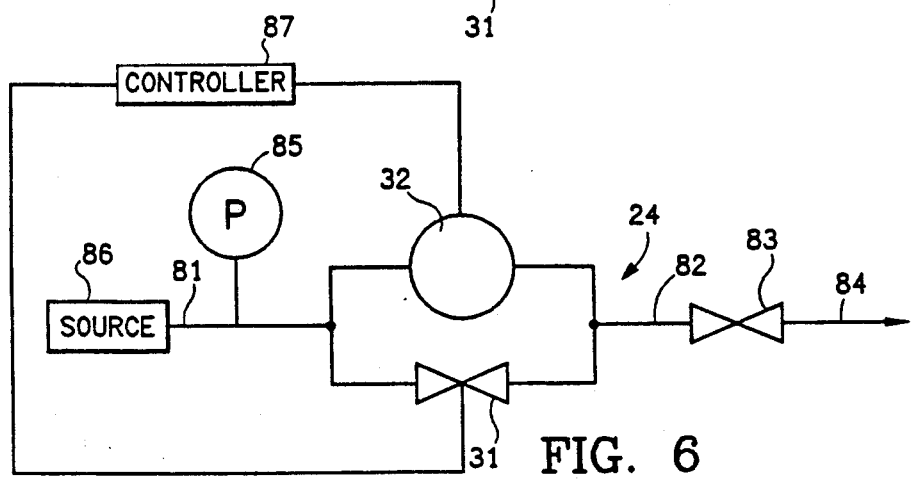
FIG. 6 is an alternative embodiment of the flow meter arrangement of FIG. 5.

In FIG. 6 an alternative embodiment of the FIG. 5 application is shown. Pressure differential sensing device 32 can be a transducer operating with controller 87. The threshold change in pressure used to open flow valve 31 may be adjustable through the controller. For example, a 0.2 psi change in pressure can be the set point to open the flow valve for one application, or a 0.5 psi change may be the set point for the detectable level of pressure differential for another application. In this embodiment the pressure differential sensing device does not directly operate the flow valve but functions through the controller, offering wider variation in flow detection and control.

Pump 14 or other sources may have a constant pressure. If so, pressure sensor 85 would not be necessary. The flow meter of the invention is equally useful where source pressure varies. At a given pressure, flow rate is proportional to the open time of valve 31. At a different pressure, the flow rate for a given open time would change according to the standard flow rate equation $$Q = k(\Delta P)^n$$

where
  k = orifice coefficient, which is a function of the shape of the effective orifice of the flow meter,
  P = pressure difference across the flow meter ($P_{in} - P_{out}$), and
  n = pressure exponent, typically 0.5, but is established by shop calibration for each flow meter.

By calibrating the flow meter at several different pressures, the flow meter accuracy can be enhanced. With the upstream pressure being determined by sensor 85, a graph or computer memory will give a reading for flow rate. By measuring ON time of valve 31 and the pressure value from sensor 85, the true flow rate can be established from a look-up table or graph, either manually or by values stored in indicator 30 of FIG. 1 or in control 33 and indicator 34 in FIG. 4. If desired, a pressure sensor can be installed in the parallel arrangement of FIGS. 1 and 4 as well as in the series combination of FIG. 5.

Device 32 is capable of sensing pressure differentials in either direction. If pressure change causes diaphragm 61 to move to the left so that contact 73 is engaged, line 91 will transmit a signal to indicator 30 or 34, with information as to the time valve 31 is open and the directional sense of the pressure differential. If the pressure change moves the diaphragm to the right, line 92 connected to contact 72 will transmit the opposite sense signal to show the other direction of the flow to equalize pressure.

It will be observed that this flow meter is very versatile. It is coupled between a fluid pressure source and a flow control valve. Where the ultimate flow through the lines is very low, a series connection can be utilized, as shown in FIGS. 5 and 6. Where there is a relatively large flow through the line, as in FIGS. 1 and 4, a parallel connection is preferable. In either case, any flow through controllable flow meter valve 31 is likely to be at a very low rate.

In view of the above description, it is likely that modifications and improvements will occur to those skilled in the art which are within the scope of the accompanying claims.

What is claimed is:

1. A flow meter for sensing low rates of fluid flow in a conduit, said flow meter comprising:
   controllable valve means;
   a pressure differential sensing device connected in parallel with said controllable valve means;
   means for coupling the parallel combination of said controllable valve means and said sensing device to the conduit;
   means for operatively coupling said sensing device to said controllable valve means to open and close said controllable valve means in response to fluid pressure changes in the conduit to maintain constant pressure in the conduit; and
   indicator means for indicating the fluid flow rate through said controllable valve means.

2. The apparatus recited in claim 1, and further comprising:
   means for monitoring flow detected by said flow meter for a predetermined period of time;
   means for establishing a predetermined flow rate set point;
   means for determining rate of flow through said flow meter; and
   indicator means for indicating that the conduit means has met the predetermined flow rate or has failed to meet the predetermined flow rate.

3. The apparatus recited in claim 1, and further comprising controller means connected to said pressure differential sensing device and being operatively coupled to said controllable valve means to open and close said controllable valve means in response to selectively set threshold levels in said controller means.

4. The apparatus recited in claim 1, wherein said flow meter is configured to sense flow in two opposite directions in the conduit.

5. The apparatus recited in claim 4, wherein said pressure differential switch provides a first output signal when fluid flow is in one direction and a second output signal when fluid flow is in the opposite direction in the conduit.

6. The apparatus recited in claim 1, wherein said parallel combination is connected in series in the conduit and all fluid flow in the conduit passes through said controllable valve means.

7. The apparatus recited in claim 6, and further comprising a pressure sensor connected in the conduit to enable flow rates at varying pressures to be determined.

8. The apparatus recited in claim 7, wherein said indicator means comprises memory and computation means for converting pressure and open time of said controllable valve to flow rate.

9. The apparatus recited in claim 1, wherein said parallel combination is connected in parallel across a closable valve, said closable valve being connected in series in the conduit.

10. The apparatus recited in claim 9, and further comprising a pressure sensor connected in the conduit to enable flow rates at varying pressures to be determined.

11. The apparatus recited in claim 10, wherein said indicator means comprises memory and computation means for converting pressure and open time of said controllable valve to flow rate.

12. The apparatus recited in claim 1, wherein said indicator means comprises memory and computation means for counting the number of times said controllable valve means is opened during a predetermined period of time and converting that number to flow rate.

13. The apparatus recited in claim 1, wherein said indicator means comprises memory and computation means for converting the period of time said controllable valve remains open to determine flow rate.

14. A flow meter for sensing flow rates of fluid flow in a conduit, said flow meter comprising:
   controllable valve means;
   a pressure differential sensing device connected in parallel with said controllable valve means;
   means for coupling the parallel combination of said controllable valve means and said sensing device to the conduit;
   means for operatively coupling said sensing device to said controllable valve means to open and close said controllable valve means in response to fluid pressure changes in the conduit to maintain constant pressure in the conduit;
   means for monitoring flow detected by said flow meter for a predetermined period of time;
   means for establishing a predetermined flow rate set point;
   means for determining rate of flow through said flow meter; and
   indicator means for indicating that the conduit means has met the predetermined flow rate or has failed to meet the predetermined flow rate.

* * * * *